(12) United States Patent
Joo et al.

(10) Patent No.: US 11,910,125 B2
(45) Date of Patent: Feb. 20, 2024

(54) CAMERA DEVICE

(71) Applicant: LG INNOTEK CO., LTD., Seoul (KR)

(72) Inventors: Yang Hyun Joo, Seoul (KR); Chul Kim, Seoul (KR); Ju Un Park, Seoul (KR); Seong Ha Jang, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 228 days.

(21) Appl. No.: 17/413,230

(22) PCT Filed: Dec. 12, 2019

(86) PCT No.: PCT/KR2019/017580
§ 371 (c)(1),
(2) Date: Jun. 11, 2021

(87) PCT Pub. No.: WO2020/122628
PCT Pub. Date: Jun. 18, 2020

(65) Prior Publication Data
US 2022/0030153 A1    Jan. 27, 2022

(30) Foreign Application Priority Data

Dec. 13, 2018  (KR) .......................... 10-2018-0161123
Dec. 14, 2018  (KR) .......................... 10-2018-0162095

(51) Int. Cl.
*H04N 23/74*    (2023.01)
*G02B 13/14*    (2006.01)
(Continued)

(52) U.S. Cl.
CPC ............. *H04N 5/33* (2013.01); *G01S 17/894* (2020.01); *G02B 3/0037* (2013.01); *G02B 7/021* (2013.01);
(Continued)

(58) Field of Classification Search
CPC .... G01R 19/0038; G01R 19/10; G01R 19/25; G01R 21/01; G01R 21/133; G01R 22/06;
(Continued)

(56) References Cited

U.S. PATENT DOCUMENTS

2009/0284489 A1     11/2009  Batchko
2012/0007880 A1*     1/2012  Huang ................. G09G 3/3406
                                                                    345/617
(Continued)

FOREIGN PATENT DOCUMENTS

JP    2014-13357 A        1/2014
JP    2014013357 A   *    1/2014   ......... G02B 19/0047
(Continued)

*Primary Examiner* — Kathleen M Walsh
(74) *Attorney, Agent, or Firm* — Birch, Stewart, Kolasch & Birch, LLP

(57) ABSTRACT

A camera device is provided. The camera device includes a light emitting portion configured to change a light path of light according to a first control signal and output the light along a first light path or a second light path, a light receiving portion configured to receive the light reflected by an object and generate an electrical signal, and a control portion configured to generate the first control signal which controls the light path of the light to be changed to the first light path or the second light path. Here, the light emitting portion outputs the light with a first pattern along the first light path or outputs the light with a second pattern along the second light path.

15 Claims, 14 Drawing Sheets

(51) Int. Cl.
*H04N 9/77* (2006.01)
*G06V 40/10* (2022.01)
*G06V 40/145* (2022.01)
*H04N 5/33* (2023.01)
*G01S 17/894* (2020.01)
*G02B 3/00* (2006.01)
*G02B 7/02* (2021.01)
*G02B 13/18* (2006.01)
*G02B 27/42* (2006.01)
*G06V 40/14* (2022.01)

(52) U.S. Cl.
CPC ............. *G02B 13/14* (2013.01); *G02B 13/18* (2013.01); *G02B 27/4205* (2013.01); *G06V 40/10* (2022.01); *G06V 40/145* (2022.01); *H04N 9/77* (2013.01); *H04N 23/74* (2023.01); *G06V 40/14* (2022.01)

(58) Field of Classification Search
CPC ...... G01R 31/085; G01S 17/894; G01S 17/36; G01S 7/4815; G01S 7/4816; G02B 13/14; G02B 13/18; G02B 27/4205; G02B 3/0037; G02B 7/021; G02B 2207/115; G02B 26/005; G02B 3/0056; G02B 3/14; G02B 7/09; G03B 17/48; G03B 3/12; H03M 1/1245; H03M 1/46; H03M 1/462; H03M 1/742; H04N 9/77; H04N 23/00; H04N 23/56; H04N 23/74; H04N 5/33; H04N 9/31; H04N 9/3152; H04N 9/3161; H04N 9/3176; G06V 40/10; G06V 40/14; G06V 40/145
USPC .......................................................... 348/77
See application file for complete search history.

(56) References Cited

U.S. PATENT DOCUMENTS

| | | | | |
|---|---|---|---|---|
| 2013/0044225 | A1* | 2/2013 | Jeon | H04N 23/71 348/E9.053 |
| 2017/0003168 | A1* | 1/2017 | Fujii | G01S 17/89 348/E9.053 |
| 2017/0289468 | A1* | 10/2017 | Fujii | H04N 23/74 |
| 2017/0348543 | A1 | 12/2017 | Depfenhart et al. | |
| 2021/0011128 | A1* | 1/2021 | Shi | G01S 7/481 |

FOREIGN PATENT DOCUMENTS

| | | | | |
|---|---|---|---|---|
| JP | 2019113530 A | * | 7/2019 | ............ G01S 17/42 |
| KR | 10-2013-0019519 A | | 2/2013 | |
| KR | 10-2017-0005649 A | | 1/2017 | |

* cited by examiner

[FIG. 1]
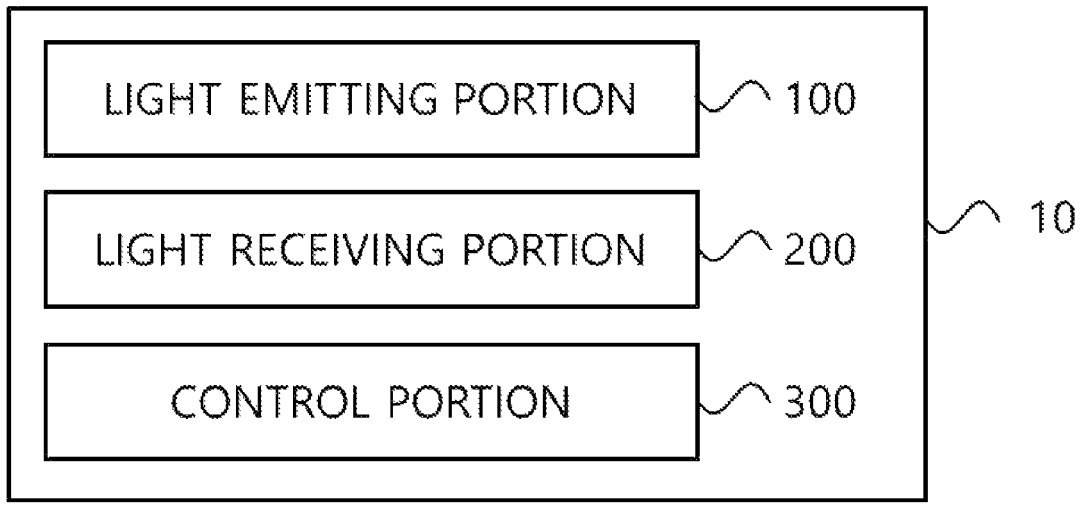
[FIG. 2]
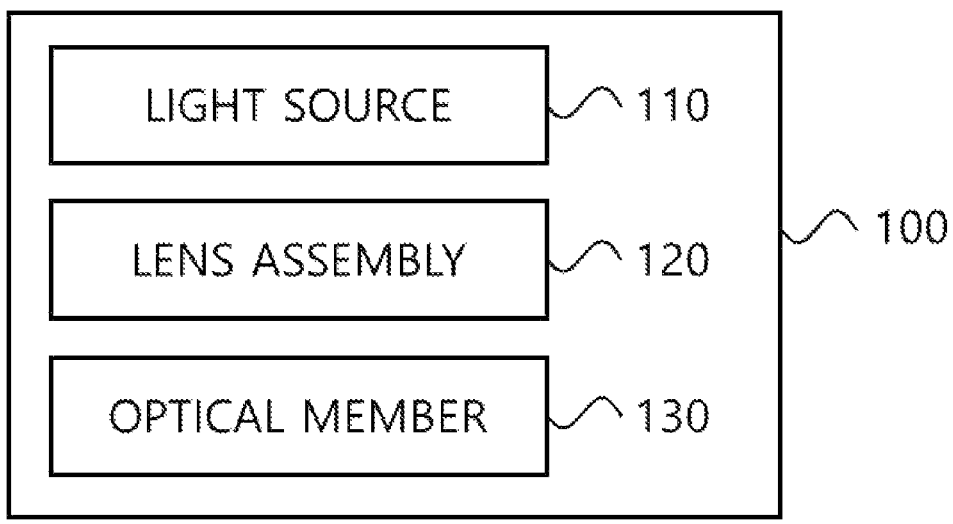
[FIG. 3a]
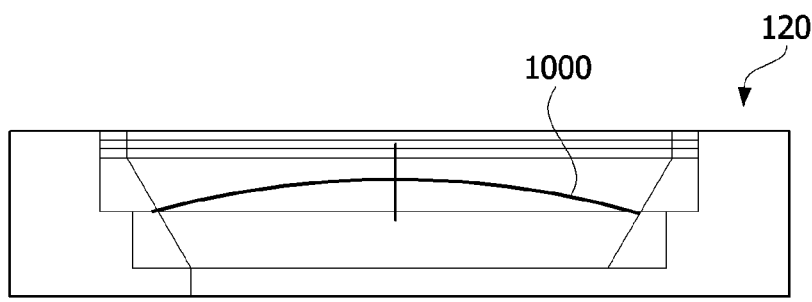

[FIG. 3b]
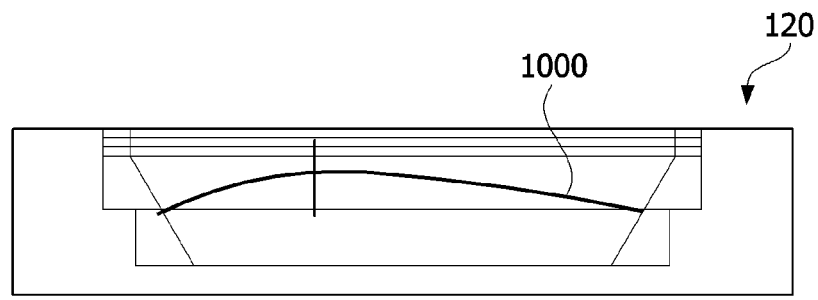
[FIG. 3c]
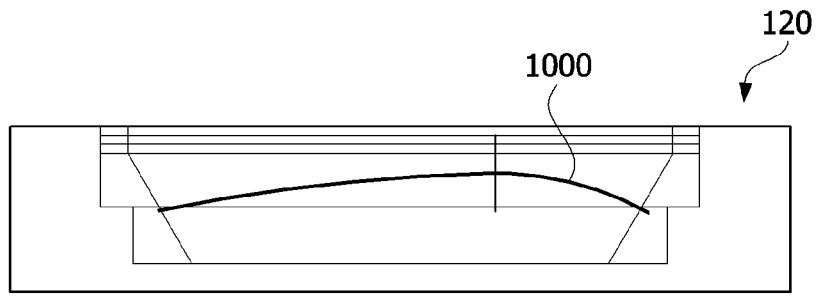
[FIG. 4a]
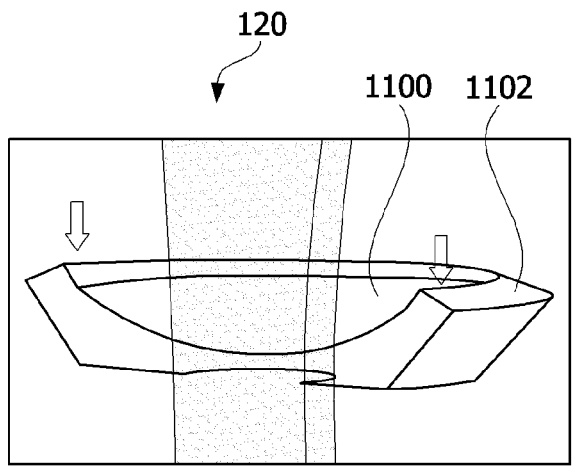

[FIG. 4b]
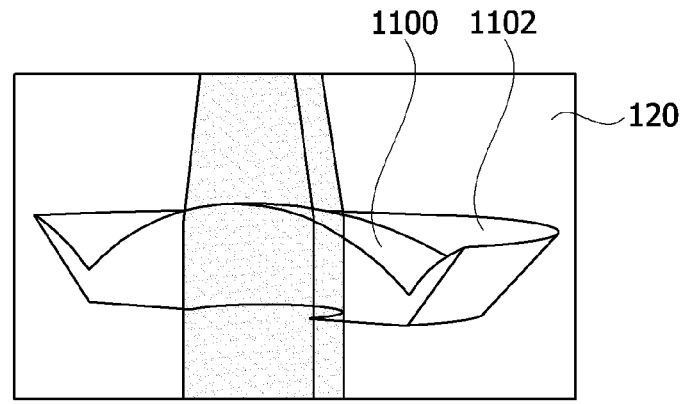
[FIG. 4c]
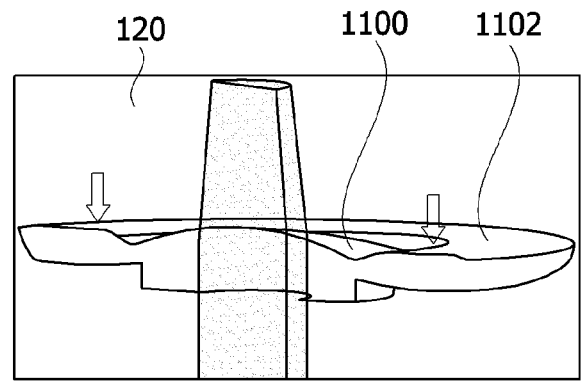
[FIG. 4d]
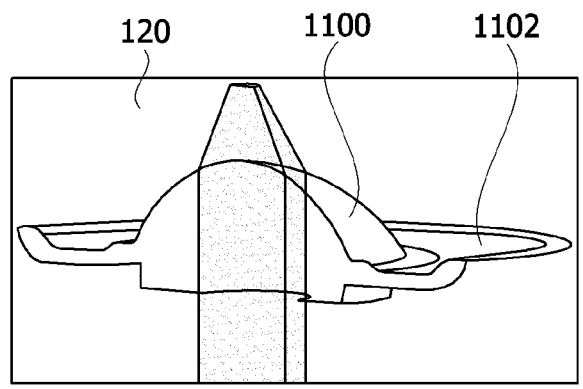

[FIG. 5a]
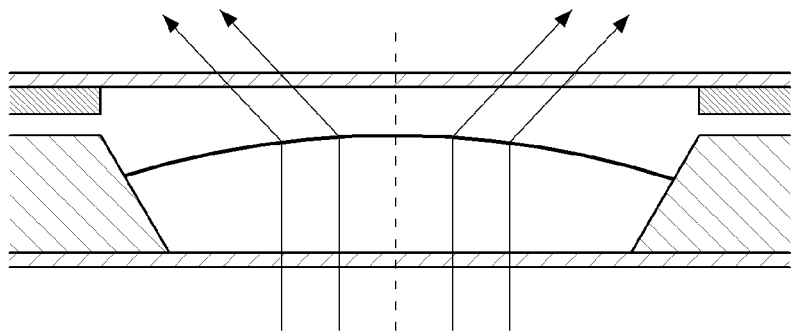
[FIG. 5b]
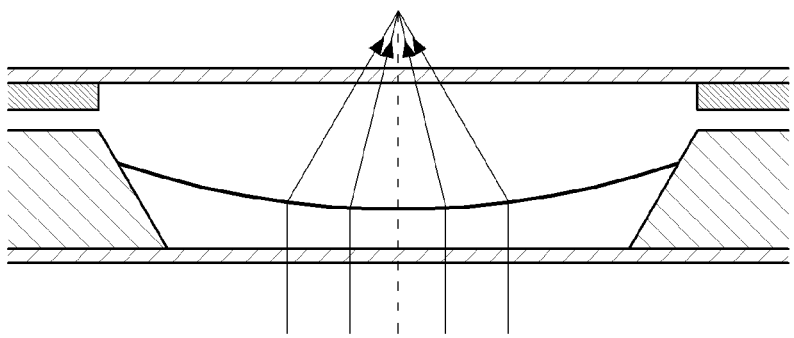
[FIG. 6]
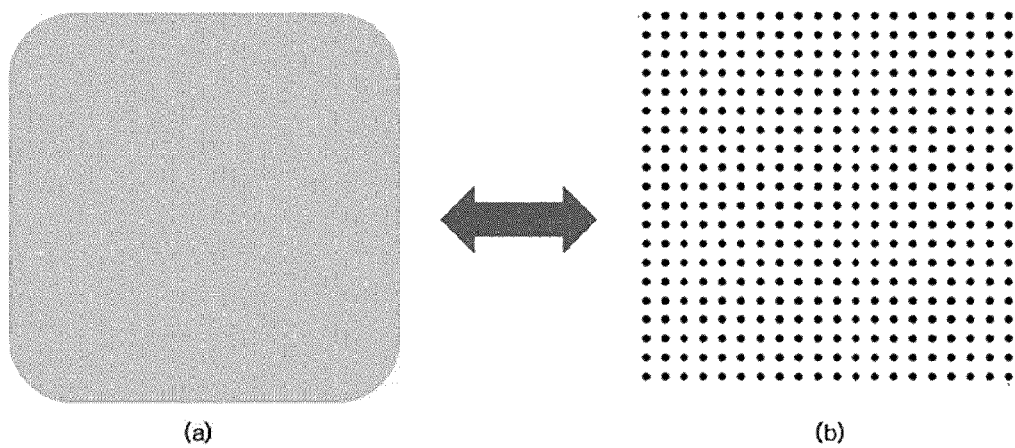
(a)          (b)

[FIG. 7a]
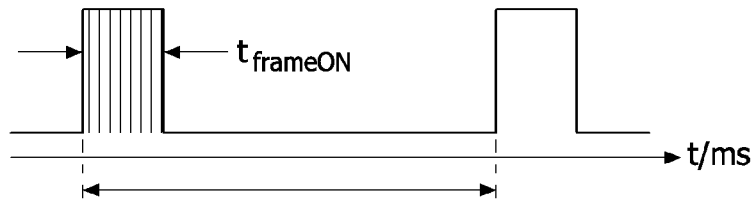
[FIG. 7b]
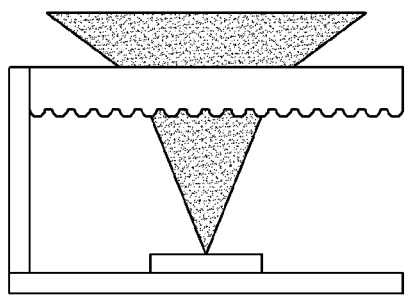
[FIG. 7c]
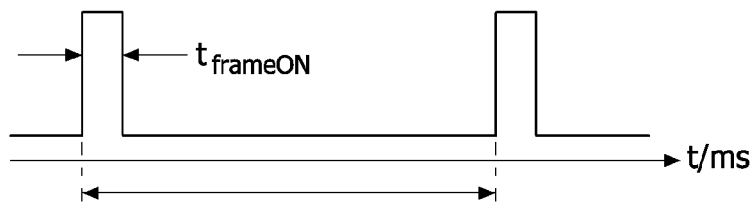
[FIG. 7d]
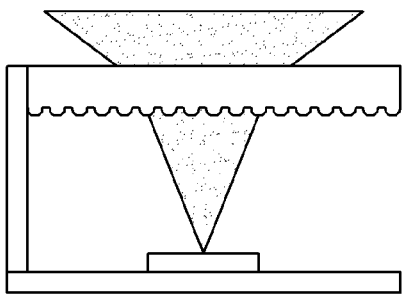

[FIG. 8a]
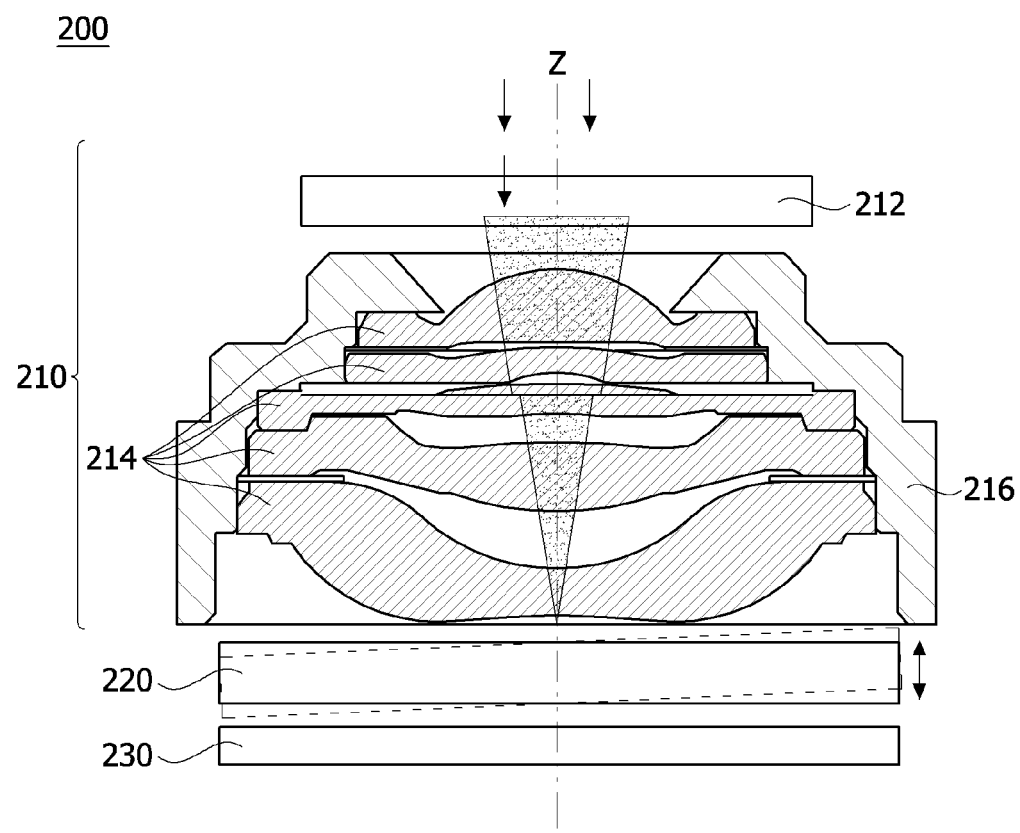

[FIG. 8b]
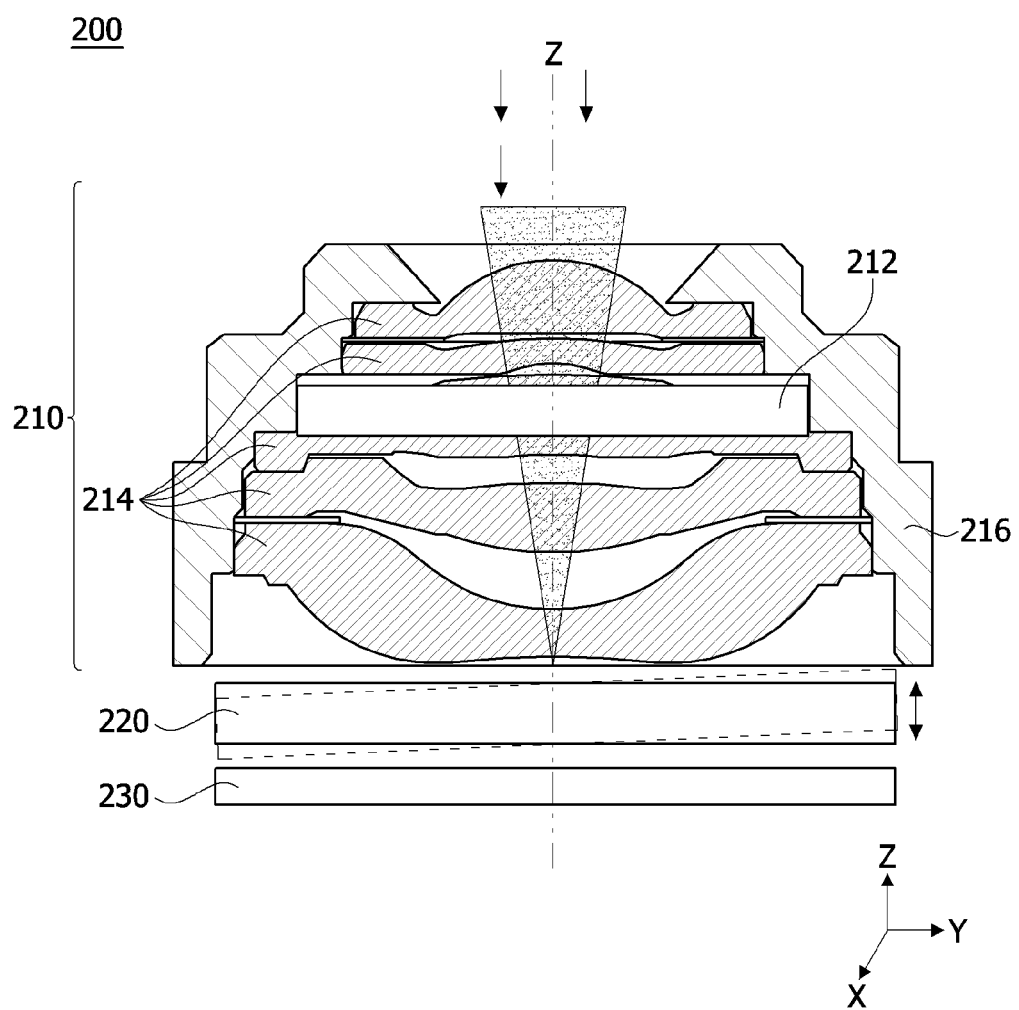

[FIG. 9a]
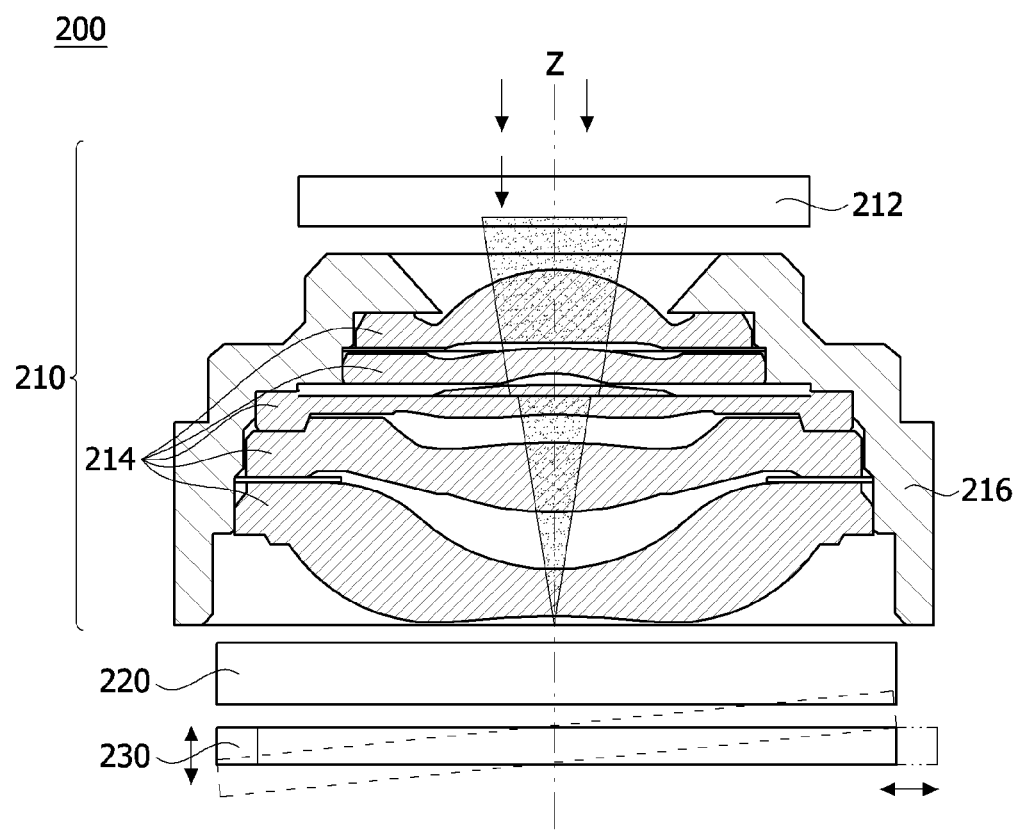

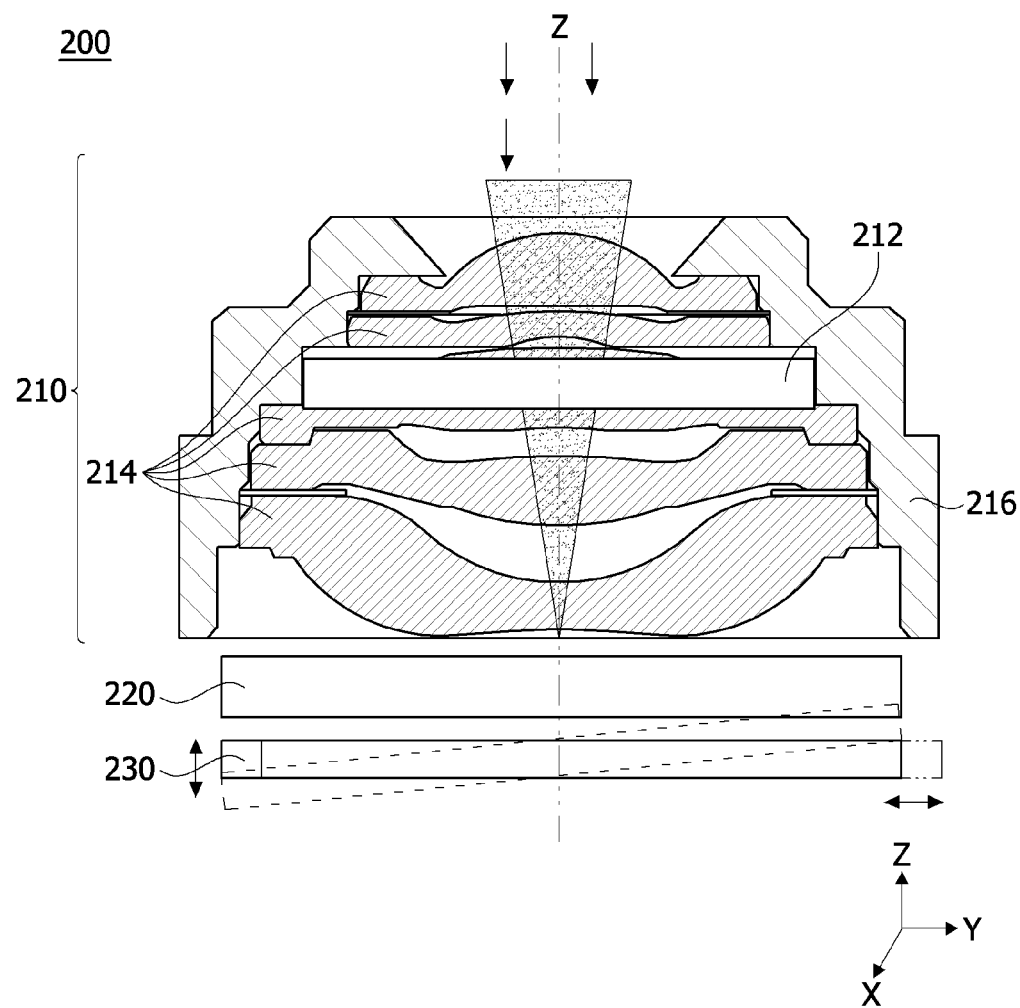
[FIG. 9b]

[FIG. 10]
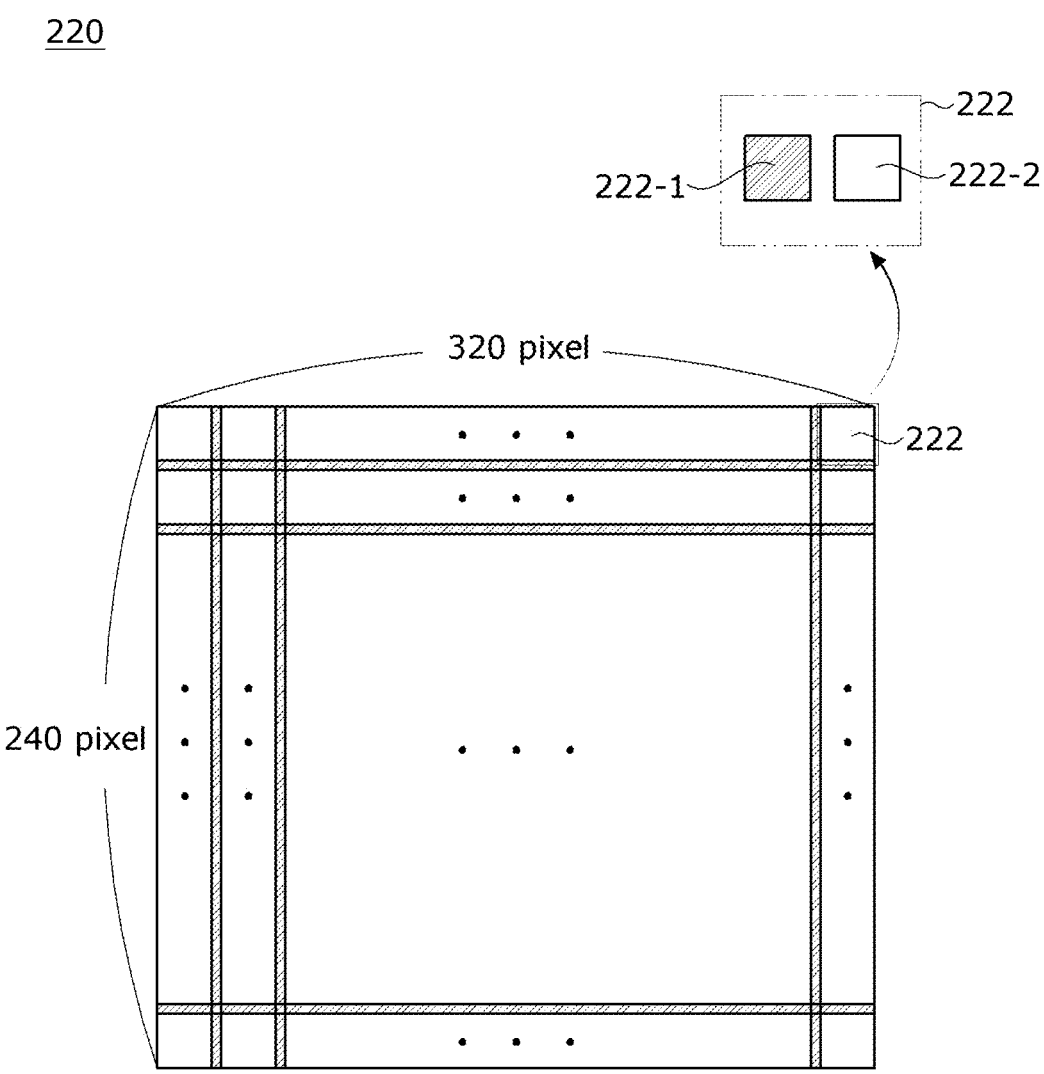

[FIG. 11a]
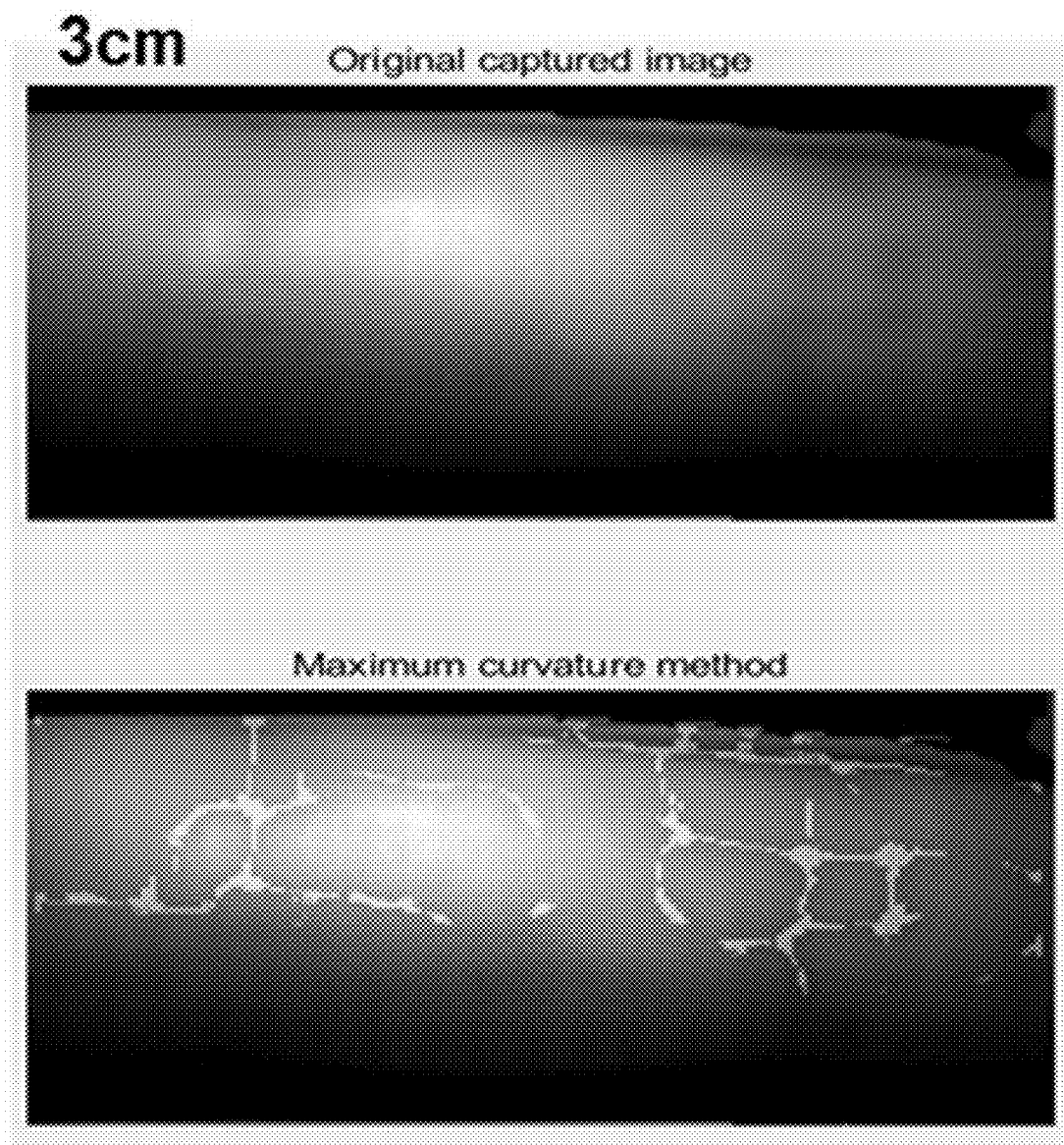

[FIG. 11b]
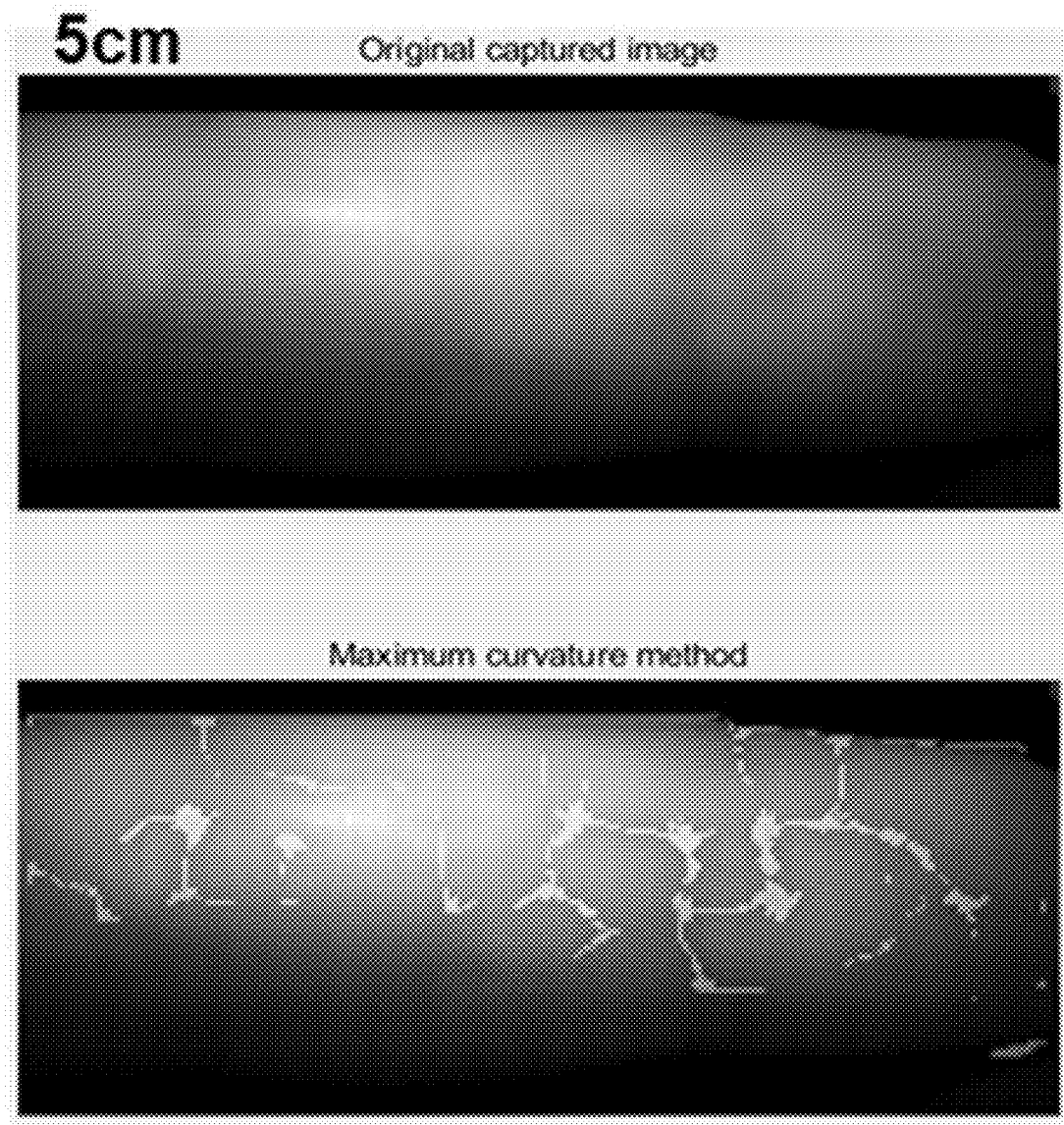

[FIG. 11c]
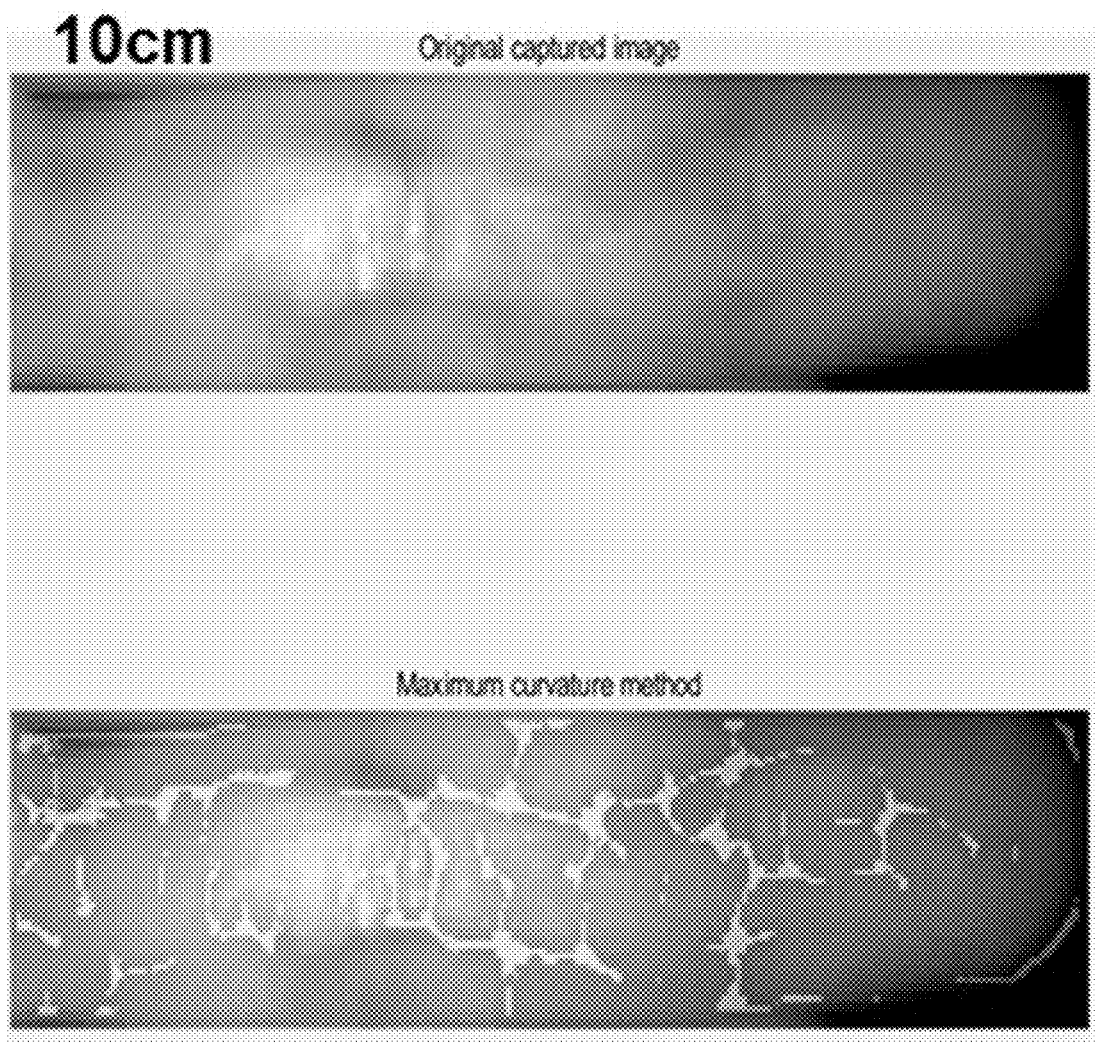

[FIG. 11d]
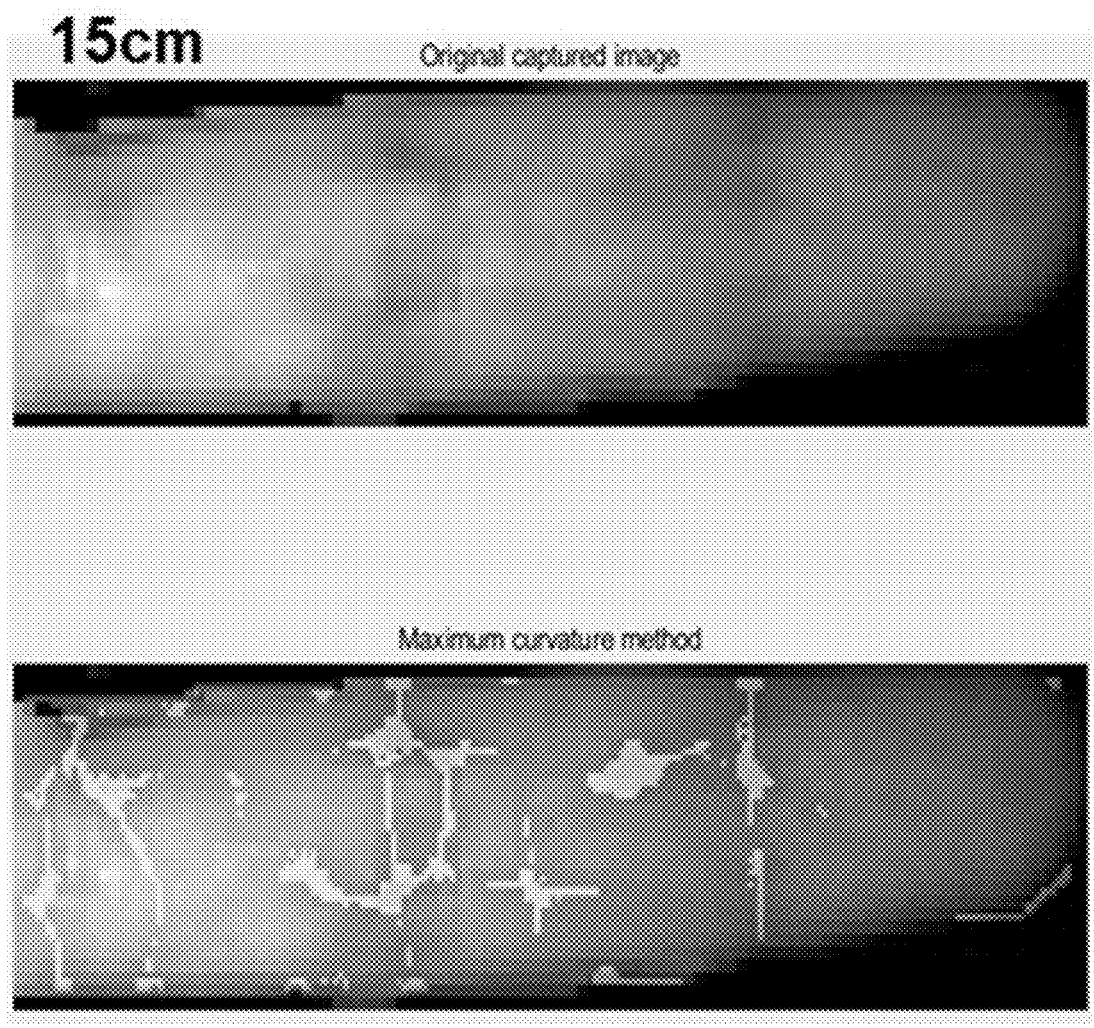

CAMERA DEVICE

CROSS REFERENCE TO RELATED APPLICATIONS

This application is the National Phase of PCT International Application No. PCT/KR2019/017580, filed on Dec. 12, 2019, which claims priority under 35 U.S.C. 119(a) to Patent Application Nos. 10-2018-0161123, filed in the Republic of Korea on Dec. 13, 2018, and 10-2018-0162095, filed in the Republic of Korea on Dec. 14, 2018, all of which are hereby expressly incorporated by reference into the present application.

TECHNICAL FIELD

The present invention relates to a camera device.

BACKGROUND ART

Three-dimensional (3D) contents have been applied to not only game and cultural fields/areas but also a variety of fields such as education, manufacturing, automatic driving, and the like. A depth map is necessary for obtaining 3D contents. The depth map is information about a spatial distance and indicates perspective information on one point from another point in a two-dimensional (2D) image. As a method of obtaining the depth map, a method of projecting infrared (IR) structured light toward an object, a method of using a stereo camera, a time of flight (TOF) method, and the like have been used.

In the case of the TOF method or the structured light method, light in an IR wavelength region has been used. Recently, there have been attempts to use features of the IR wavelength region in biometric authentication. For example, a shape of veins spreading in a finger and the like does not change during one's lifetime from a fetal stage and is different for every person. Accordingly, a venous pattern may be identified using a camera device with an IR light source mounted thereon. To this end, a finger may be detected by capturing an image of the finger and removing a background on the basis of a shape and color of the finger, and a venous pattern of the finger may be extracted from color information of the detected finger. That is, average color of the finger, color of veins distributed in the finger, and color of wrinkles of the finger may differ. For example, the color of veins distributed in the finger may be dimmer red in comparison to the average color of the finger, and the color of wrinkles of the finger may be darker in comparison to the average color of the finger. An approximate value of veins may be calculated for each pixel using the above features, and a venous pattern may be extracted using a result of calculation. Also, an individual may be identified by comparing the extracted venous pattern of the finger with pre-registered data.

However, since a pattern of a light source for generating an IR image and a pattern of a light source of a projector configured to output structured light differ from each other, it is necessary to mount different light source modules. Accordingly, a volume of a camera device increases.

Also, in the case of an IR image for recognizing branch veins and the like, an image is captured while a finger and the like comes close to the camera device. Here, when light having the same intensity as that of the structured light projector is emitted, a light saturation phenomenon occurs such that it is impossible to obtain an image.

DISCLOSURE

Technical Problem

The present invention is directed to providing a camera device in which a light source configured to capture an infrared (IR) image and a structured light projector are coupled as one module.

The present invention is directed to providing a camera device capable of preventing a light saturation phenomenon while capturing an IR image by adjusting intensity of light.

The present invention is directed to providing a camera device capable of controlling light intensity of output light.

The present invention is directed to providing a camera device including a time of flight (TOF) function to extract branch veins.

Aspects of the present invention are not limited thereto and include objectives and effects which are recognizable from the following aspects or embodiments.

Technical Solution

One aspect of the present invention provides a camera device. The camera device includes a light emitting portion configured to change a light path of light according to a first control signal and to output the light along a first light path or a second light path, a light receiving portion configured to receive the light reflected by an object and generate an electrical signal, and a control portion configured to generate the first control signal which controls the light path of the light to be changed to the first light path or the second light path. Here, the light emitting portion outputs the light with a first pattern along the first light path or outputs the light with a second pattern along the second light path.

The first pattern may include a surface light source pattern, and the second pattern may include a point light source pattern.

The light emitting portion may include a light source comprising a plurality of light emitting elements and configured to generate the light, a lens assembly configured to condense light generated by the light source and output the condensed light along the first light path or the second light path, and an optical member disposed to be spaced apart from the light source and configured to diffract the light.

The plurality of light emitting elements may be multiple vertical cavity surface emitting laser (VCSEL) elements.

The lens assembly may include a first liquid and a second liquid having a refractive index different from that of the first liquid, and an interface formed by the first liquid and the second liquid may vary according to the first control signal.

The lens assembly may change a level of scattering the light according to a curvature of the interface formed by the first liquid and the second liquid.

The lens assembly may be disposed between the light source and the optical member or disposed on an upper end of the optical member.

The light emitting portion may supply power of a power source to the light source according to a second control signal.

When the light is output along the first light path, the light emitting portion may generate light by separately operating some of the plurality of light emitting elements according to the second control signal or generate the light by operating light emitting elements arranged in a preset region among the plurality of light emitting elements.

The second control signal may control an exposure time of the light or a duty rate of a power pulse of the light.

The light emitting portion may include a plurality of switching elements connected to the plurality of light emitting elements. The light emitting portion may supply power to the light source by turning on the plurality of switching elements in a pulse generation section of the second control signal and stop power supply to the light source by turning off the plurality of switching elements in a non-pulse generation section of the second control signal.

The control portion may control a pulse width of the second control signal according to a chroma value of image data corresponding to the electrical signal. A preset pulse width of the second control signal may is maintained when the chroma value differs from a preset maximum chroma value. The preset pulse width of the second control signal may be reduced when the chroma value is equal to the preset maximum chroma value.

The optical member may be implemented to have a plate shape including a first surface configured to receive the light and a second surface configured to output the light being diffracted. The first surface may include a plurality of micro lenses arranged at certain pitches, and the second surface may be implemented to have a plane or a spherical shape having a certain curvature.

The light may have a wavelength of a near IR (NIR) region.

The light emitting portion may output the light towards a human body, and the light receiving portion may condense light that is unabsorbed into hemoglobin, which is included in blood of the human body, and reflected by the human body.

Advantageous Effects

According to the embodiments, a projector for outputting structured light and an IR LED light source may be coupled as one module.

A volume of modules may be reduced by coupling different types of output ends as one module.

A light saturation phenomenon may be prevented by adjusting light intensity of a light source.

According to the embodiments, there is provided an advantage of obtaining an IR image having high accuracy regardless of a distance from an object.

According to the embodiments, there is provided an advantage of obtaining a depth map and a two-dimensional IR image at the same time using one light source.

A variety of advantageous effects of the present invention are not limited thereto and will be easily understood throughout the detailed description of the embodiments.

DESCRIPTION OF DRAWINGS

FIG. 1 is a configuration diagram of a camera device according to an exemplary embodiment of the present invention;

FIG. 2 is a configuration diagram illustrating a light emitting portion according to an exemplary embodiment of the present invention;

FIGS. 3A to 3C illustrate an example of a lens assembly included in the camera device according to one embodiment of the present invention;

FIGS. 4A to 4D illustrate another example of the lens assembly included in the camera device according to one embodiment of the present invention;

FIGS. 5A and 5B are views illustrating a light refraction mechanism of the light emitting portion according to an exemplary embodiment of the present invention;

FIG. 6 is views illustrating a change in a pattern of light output from the light emitting portion according to an exemplary embodiment of the present invention;

FIGS. 7A to 7D are views illustrating a process of varying a second control signal of a control portion according to an exemplary embodiment of the present invention;

FIGS. 8A and 8B are cross-sectional views illustrating a part of a light receiving portion according to one embodiment of the present invention;

FIGS. 9A and 9B are cross-sectional views illustrating a part of a light receiving portion according to another embodiment of the present invention;

FIG. 10 is a view illustrating an image sensor according to an exemplary embodiment of the present invention; and FIGS. 11A to 11D are views illustrating a result of extracting branch veins according to controlling intensity of output light.

MODES OF THE INVENTION

Hereinafter, exemplary embodiments of the present invention will be described in detail with reference to the drawings.

However, the present invention is not limited to the embodiments disclosed below but can be implemented in various forms. One or more components of the embodiments may be selectively combined or substituted with one another without departing from the scope of the technical concept of the present invention.

Also, unless defined otherwise, the terms (including technical and scientific terms) used herein may be used as meanings capable of being commonly understood by one of ordinary skill in the art. Also, terms defined in generally used dictionaries may be construed in consideration of the contextual meanings of the related art.

Also, the terms used herein are intended to describe the embodiments but not intended to restrict the present invention.

In the specification, unless particularly stated otherwise, singular forms include plural forms. When at least one (or one or more) of A, B, and C is indicated, this may include one or more of all combinations of A, B, and C.

Also, in describing elements of the embodiments of the present invention, the terms such as first, second, A, B, (a), (b), and the like may be used.

These terms are merely for distinguishing one element from another, and the essential, order, sequence, and the like of corresponding elements are not limited by the terms.

Also, when it is stated that one element is "connected," or "coupled" to another, the element may not only be directly connected or coupled to the other element but may also be connected or coupled to the other element with another intervening element.

Also, when it is stated that an element is formed or disposed "above (on) or below (beneath)" another element, the two elements may not only come into direct contact with each other but also still another element may be formed or disposed between the two elements. Also, being "above (on) or below (beneath)" may include not only an upward direction but also a downward direction on the basis of one element.

Hereinafter, the embodiments will be described below in detail with reference to that attached drawings. However, equal or corresponding components will be referred to as the same reference numerals regardless of drawing signs, and a repetitive description thereof will be omitted.

FIG. 1 is a configuration diagram of a camera device according to an exemplary embodiment of the present invention.

Referring to FIG. 1, a camera device 10 according to an exemplary embodiment includes a light emitting portion 100, a light receiving portion 200, and a control portion 300.

The light emitting portion 100 outputs light along a first light path or a second light path.

In detail, the light emitting portion 100 receives power and generates and outputs light. Here, the light emitting portion 100 may output light along the first light path or the second light path. The light emitting portion 100 changes a light path of the light to the first light path or the second light path according to a first control signal. In detail, the light emitting portion 100 converts a light path between a light generation time point and an object-incident time point into the first light path or the second light path. The light emitting portion 100 may include a device capable of changing a light path such as a liquid lens. According to one embodiment of the present invention, the light emitting portion 100 may output light according to another light path in addition to the first light path and the second light path.

The light output along the first light path may have a first pattern. In this case, the light having the first pattern may be emitted to an object. The light output along the second light path may have a second pattern. In this case, the light having the second pattern may be emitted to an object. The first pattern may be a point light source pattern, and the second pattern may be a surface light source pattern.

The light emitting portion 100 may generate and output light having a pulse wave form or a continuous wave form. The continuous wave form may be a sinusoid wave form or a squared wave form. The camera device 10 may detect a phase difference between light output from the light emitting portion 100 and light reflected by an object and input to the camera device 10 by generating pulse wave type or continuous wave type light.

The light emitting portion 100 may emit the generated light toward the object for a certain exposure cycle. Here, the exposure cycle means one frame cycle. When a plurality of frames are generated, a preset exposure cycle is repeated. For example, when the camera device 10 captures an image of the object at 20 frames per second (FPS), the exposure cycle becomes $\frac{1}{20}^{th}$ of second. Also, when 100 frames are generated, the exposure cycle may be repeated 100 times.

The light emitting portion 100 may generate a plurality of rays of light having different frequencies. The light emitting portion 100 may sequentially generate a plurality of rays of light having different frequencies. Otherwise, the light emitting portion 100 may generate a plurality of rays of light having different frequencies at the same time. Detailed components of the light emitting portion 100 will be described below in detail with reference to the drawings.

After the light emitting portion 100 outputs light, the light receiving portion 200 receives light reflected by an object and generates an electrical signal. The electrical signal may be used to generate image data.

In order to receive and then convert the light into the electrical signal, the light receiving portion 200 may include a device for condensing light and a device for converting the condensed light into an electrical signal. According to the embodiment of the present invention, the light receiving portion 200 may change a light path of the light according to a certain pattern. Accordingly, a plurality of images corresponding to electrical signals generated through the light with the light path changed according to the certain pattern may be generated. The plurality of images may be converted into high-resolution images using a super resolution method. The components of the light receiving portion 200 will be described below in detail with reference to the drawings.

The control portion 300 may generate the first control signal which controls the light path of the light to be changed into the first light path or the second light path. Also, the control portion 300 may generate a second control signal for enabling power of a power source to be supplied to a light source. The control portion 300 may generate the second control signal on the basis of a chroma value of the image data.

FIG. 2 is a configuration diagram illustrating the light emitting portion according to an exemplary embodiment of the present invention.

Referring to FIG. 2, the light emitting portion 100 includes a light source 110, a lens assembly 120, and an optical member 130.

The light source 110 generates light. According to one embodiment, a wavelength of the light generated by the light source 110 may be a wavelength within an infrared (IR) range of 770 to 3000 nm and may be a wavelength within a visible ray range of 380 to 770 nm. According to one embodiment, the light source 110 may generate light having a wavelength of a near IR (NIR) region, that is, NIR light. For example, a wavelength of NIR light may be 0.75 to 3 μm.

The light source 110 may be implemented using a plurality of light-emitting elements emitting light. The plurality of light-emitting elements may include a laser diode (LD), a vertical cavity surface emitting laser (VCSEL), a light emitting diode (LED), and an organic LED (OLED). According to the embodiment of the present invention, when the VCSEL as a light emitting element is used as the light source 110, a manufacturing process may be simplified, parallel signal processing may be easily performed through miniaturization and high integration, and power consumption may be reduced. However, the light source 110 is not limited thereto.

The light source 110 may be implemented in a shape in which the plurality of light emitting elements are arrayed according to a certain pattern. The light source 110 may be implemented as a chip on which the plurality of light emitting elements are arrayed. The shape in which the plurality of light emitting elements are arrayed may be changed in design by those skilled in the art according to a purpose of the camera device 10 according to the embodiment of the present invention.

The light source 110 may be disposed on one surface of a printed circuit board (PCB). The light source 110 may be electrically connected to the PCB and may receive power necessary for outputting light through the PCB. In the present invention, the PCB may be implemented as a flexible PCB to secure a certain level of flexibility. In addition, the PCB may be implemented as one of a resin-based PCB, a metal-core PCB, a ceramic PCB, and an FR-4 substrate.

The light source 110 may drive the plurality of arrayed light emitting elements to be different according to a certain condition. In detail, when the lens assembly 120 changes the light path of the light into the first light path, in the light source 110, some of the plurality of light emitting elements may separately operate and generate light or light emitting elements arranged in a preset region among the plurality of light emitting elements may operate and generate light according to the second control signal. That is, not all of the plurality of arrayed light emitting elements are driven and only some light emitting elements may be operated or only light emitting elements in a preset particular region may be operated.

The light output along the first light path may form a surface light source pattern, and the surface light source pattern may be used to obtain an IR image. The IR image may be used, for example, to recognize a facial contour, to measure a vein pattern, or the like. Even when the IR image is incident on a smaller region than that of a point light source pattern used for three-dimensional (3D) modeling and the like, a purpose thereof may be accomplished. However, when all of the plurality of light emitting elements are driven to accomplish the purpose, unnecessary power consumption may occur and high intensity of light may have a bad influence on human eyes during facial contour recognition. To fix these problems, according to the embodiment of the present invention, when light having a surface light source pattern is output, some light emitting elements may be operated or only light emitting elements in a certain region may be operated.

The light source 110 may adjust intensity of light by changing a duty rate of a power pulse of light or changing an exposure time of light according to the second control signal. When an object is located close to the camera device 10 like a case of measuring vein of a palm or finger, light saturation may occur such that it is impossible to obtain an IR image. Here, when an object is located far from the camera device 10, this light saturation may be prevented but resolution of an IR image is decreased. However, since the light source 110 according to the embodiment of the present invention adjusts intensity of light by changing an exposure time or a power pulse duty rate of output light, the light saturation phenomenon may be prevented.

The light source 110 may include a plurality of switching elements driven according to the second control signal. The switching elements may control power of a power source to be supplied or not to be supplied to the plurality of light emitting elements according to the second control signal. The switching elements may control the power to be supplied to the light emitting elements by being repetitively turned on/off according to a control signal. In detail, the light source 110 turns the switching element connected to the light source on or off according to the second control signal. Here, the control signal may be implemented as a pulse train. The switching element is turned on in a section in which a pulse occurs in the control signal such that power is supplied to the light emitting element and the switching element is turned off in a section in which a pulse does not occur in the control signal such that power supply to the light emitting element is stopped.

To this end, the switching element is disposed between the power source and the light emitting portion 100, in more detail, the light emitting element which is a light source included in the light emitting portion 100 and controls power of the power source applied to the light emitting element. The switching element may include a field effect transistor (FET).

The lens assembly 120 may refer to an optical element which changes a light path of light passing therethrough. The lens assembly 120 may refer to a variable lens which changes a light path of light passing therethrough. The lens assembly 120 may include a liquid lens. The lens assembly 120 may change the light path of the light to the first light path or the second light path according to the first control signal.

The lens assembly 120 may be disposed on an upper end of the optical member 130. The upper end of the optical member 130 may refer to a direction of one surface of the optical member 130 which outputs light. Otherwise, the lens assembly 120 may be disposed between the light source 110 and the optical member 130. That is, the lens assembly 120 may be disposed on the upper end of the light source 110 and a bottom end of the optical member 130.

The optical member 130 may modulate a phase and amplitude of light condensed by the lens. The optical member 130 may include a diffractive optical element (DOE). The diffractive optical element may be an element including a micro or nano-scaled uneven structure. The diffractive optical element converts light into light having a preset-shaped wave front by modulating the phase and amplitude of light input to an uneven surface structure. The light with the wave front modulated by the diffractive optical element may proceed through a space or over a medium according to a wave diffraction principle.

The optical member 130 may scatter and output light. The optical member 130 may scatter input light according to a certain scattering pattern. The optical member 130 may increase uniformity in brightness of light output from the light source 110 by scattering the light while simultaneously removing a hot spot, at which the light is condensed, in a place corresponding to where the light emitting element is located. That is, the optical member 130 may uniformly scatter output light over an entire surface by scattering input light. The optical member 130 may include a diffusion plate, a diffusion member, a diffuser, and the like.

According to the embodiment of the present invention, the optical member 130 may diffract or scatter light or may both diffract and scatter light.

The optical member 130 may be disposed on an entire surface of the light source 110. Here, the entire surface of the light source 110 may refer to one surface located in a direction in which light is output from the light source 110. The optical member 130 may be disposed to be spaced a certain distance from the light source 110. A distance between the optical member 130 and the light source 110 may be changed in a design by those skilled in the art in consideration of the use of the camera device 10 and a shape, a type, and the like of the light source 110.

The optical member 130 may be implemented to have a plate shape including a first surface to which light is input and a second surface from which scattered light is output. The optical member 130 may be implemented to have a spherical or plane shape. Micro lenses are arranged at uniform pitches on the first surface of the optical member 130. Here, input light is scattered by adjusting an angle of light condensed through the first surface according to a size, curvature, refractive index of the micro lenses, a size of the pitches, and the like and is output through the second surface. The size, curvature, and refractive index of the micro lenses and the size of the pitches may be changed in a design by those skilled in the art in consideration of the use of the camera device 10 according to the embodiment of the present invention, the distance between the optical member 130 and the light source 110, the shape and type of the light source 110, and the like.

FIGS. 3A to 3C illustrate an example of a lens assembly included in the camera device according to one embodiment of the present invention.

FIGS. 3A to 3C illustrate the lens assembly 120 including a first liquid and a second liquid. The lens assembly 120 includes the first liquid and the second liquid. The first liquid and the second liquid may be filled in a chamber. Here, the first liquid and the second liquid have refractive indexes different from each other. The lens assembly 120 may include two types of liquids (for example, a conductive liquid and a nonconductive liquid) having different properties.

As shown in FIGS. 3A to 3C, in the lens assembly 120, an interface 1000 may be formed between the two types of liquids and a curve, inclination, and the like of the interface 1000 may vary according to an applied voltage. Although not shown in FIGS. 3A to 3C, in the lens assembly 120, a curvature of the interface 1000 may vary according to the first control signal. In the lens assembly 120, the curvature of the interface 1000 may change to a concave or convex shape. In the lens assembly 120, a scattering degree of light may vary according to the curvature of the interface 1000 formed by the first liquid and the second liquid.

FIGS. 4A to 4D illustrate another example of the lens assembly included in the camera device according to one embodiment of the present invention.

According to the embodiment of the present invention, the lens assembly 120 may have a shape in which the chamber filled with the liquids is sealed using a membrane 1100. The lens assembly 120 may change a light path of light by deforming a shape of the membrane 1100 using a force applied to a particular position of the membrane 1100. In the lens assembly 120, the shape of the membrane 1100 may be concave as shown in FIG. 4A or may be convex as shown in FIG. 4B according to a voltage applied to a ring 1102 surrounding an edge of the membrane 1100. In the lens assembly 120, a curvature of the membrane 1100 may be decreased as shown in FIG. 4C or may be increased as shown in FIG. 4D according to the voltage applied to a ring 1102 surrounding an edge of the membrane 1100.

As another example, a lens assembly may include two plates spaced at a certain interval from each other. The lens assembly may change a light path of light by changing a gradient of at least one of the two plates.

FIGS. 5A and 5B are views illustrating a light refraction mechanism of the light emitting portion according to an exemplary embodiment of the present invention.

The light refraction mechanism will be described assuming a lens assembly including first and second liquids having different refractive indexes with reference to FIGS. 5A and 5B.

The first liquid is located above the second liquid, and the two liquids have different properties and refractive indexes. Accordingly, the two liquids may form an interface. The interface may move along an inner wall of a cavity due to a voltage applied to an electrode. The lens assembly may have a negative diopter in an initial state in which a voltage is not applied to the electrode. As shown in FIG. 5A, the interface formed by the first liquid and the second liquid may have a shape convex in a direction in which light is output. Accordingly, light passing through the lens assembly may be scattered.

The lens assembly may have a positive diopter as a voltage is applied to the electrode. As shown in FIG. 5B, in a second optical member, an interface formed by a first liquid and a second liquid may be concave in a direction in which light is output. As a voltage is applied to the electrode, the interface may become more concave.

FIGS. 6A and 6B are views illustrating a change in a pattern of light output from the light emitting portion according to an exemplary embodiment of the present invention.

First, when light is output along the first light path, the light may have a surface light source pattern as shown in FIG. 6A. When light is output along the first light path, the lens assembly may form a surface light source pattern by scattering light. That is, the surface light source pattern refers to a light source pattern which diffuses (scatters) a plurality of condensed point light sources.

In one embodiment, when a lens assembly is disposed between an optical member and a light source, light output from the light source may pass through the lens assembly and then pass through the optical member to be emitted toward an object. The light generated by the light source may be scattered while passing through the lens assembly, and the scattered light may be emitted toward the object according to a surface light source pattern while passing through the optical member.

In another embodiment, when a lens assembly is disposed above an optical member, light output from a light source may pass through the optical member and then pass through the lens assembly to be emitted toward an object. Although the light generated by the light source forms a certain pattern while passing through the optical member, the light forming the certain pattern is scattered by the lens assembly so as to be emitted toward the object according to a surface light source pattern.

Consequently, when the light is output along the light path, the light is scattered by the lens assembly so as to be emitted toward the object as a shape of the surface light source pattern as shown in FIG. 6A.

Next, when light is output along the second light path, the light may have a point light source pattern as shown in FIG. 6B. The point light source pattern is a pattern in which points are arranged at certain intervals, and certain intervals among points may be determined according to a pattern shape of the optical member. That is, when the light is output along the second light path, the light is emitted toward the object according to the point light source pattern generated by the light passing through the optical member. Consequently, even when the lens assembly is disposed between the optical member and the light source or disposed above the optical member, the lens assembly may control light not to be scattered.

FIGS. 7A to 7D are views illustrating a process of varying the second control signal of the control portion according to an exemplary embodiment of the present invention.

For convenience of description, the present invention is assumed to capture an image of user's branch veins. In FIGS. 7B and 7D, darkness of a shaded area indicates intensity of light. As the shaded area becomes darker, the intensity of light becomes higher.

First, a user places his or her finger at a position close to the camera device and then primary image capturing is performed. Here, the control portion transmits the second control signal of the pulse train as shown in FIG. 7A to the light emitting portion, and the light emitting portion emits light as shown in FIG. 7B toward the finger.

Then, the control portion receives image data generated from an electrical signal corresponding to the light shown in FIG. 7B. Also, the control portion calculates and compares a chroma value of the image data with a threshold value. The image data may be raw data of 8 bits, and the chroma value may be any one of 0 to 255.

The control portion compares the chroma value calculated from the image data with a preset maximum chroma value. Here, since the chroma value has a value within a range from 0 to 255, a maximum chroma value may be set as 255. However, the threshold value may be replaced with any preset value by those skilled in the art.

When the calculated chroma value does not coincide with the maximum chroma value, the control portion maintains the pulse train of FIG. 7A. That is, the control portion maintains a preset pulse width of the second control signal. On the other end, since light saturation occurs when the chroma value coincides with the threshold value, the pulse width of the second control signal is reduced as shown in FIG. 7C. When the pulse width of the second control signal is reduced, a power amount supplied to the light emitting portion may become reduced and the light emitting portion may output light with decreased intensity as shown in FIG. 7D.

Meanwhile, according to the embodiment of the present invention, the pulse width may be reduced corresponding to a magnitude of the chroma value. For example, the control portion may linearly control the pulse width according to the magnitude of the chroma value. For example, the pulse width may be reduced in proportion to a difference between the chroma value of the image data and the threshold value. When the chroma value is 235, a preset pulse width of a control signal may be reduced by ½. When the chroma value is 245, a preset pulse width of a control signal may be reduced by ⅓. As another example, the control portion may reduce the pulse width like a form of a step function according to the magnitude of the chroma value. For example, at a chroma value of 230 to 235 may reduce the pulse width by ¾. At a chroma value of 235 to 240 may reduce the pulse width by ½.

This example is not a configuration intended to limit the present invention and may be implemented as a variety of modified examples in addition thereto.

Hereinafter, the light receiving portion according to the embodiment of the present invention will be described in detail with reference to FIGS. 8A to 9B.

FIGS. 8A and 8B are cross-sectional views illustrating a part of the light receiving portion according to one embodiment of the present invention. FIGS. 9A and 9B are cross-sectional views illustrating a part of the light receiving portion according to another embodiment of the present invention.

The light receiving portion 200 of the camera device 10 according to the embodiment of the present invention may include an IR filter 220, a lens module 210, and an image sensor 230. In the light receiving portion 200, the IR filter 220 may be disposed on an upper end of the image sensor 230 disposed on a PCB and the lens module 210 may be disposed on an upper end of the IR filter 220. Here, the PCB may be the same substrate equal to the PCB on which the light source is disposed.

Referring to FIGS. 8A to 9B, the lens module 210 may include the IR filter 220, a plurality of solid lenses 214 disposed above the IR filter 220 and a liquid lens 212 disposed above the plurality of solid lenses 214 or disposed between the plurality of solid lenses 214.

According to one embodiment, as shown in FIGS. 8A and 9A, the liquid lens 212 may be disposed above the plurality of solid lenses 214. As described above, disposing the liquid lens 212 above the plurality of solid lenses 214 may be referred to as an add-on method. Here, a plurality of such liquid lenses 212 may be included.

According to another embodiment, as shown in FIGS. 8B and 9B, the liquid lens 212 may be disposed between the plurality of solid lenses 214. As described above, disposing the liquid lens 212 between the plurality of solid lenses 214 may be referred to as an add-in method. In the case of the add-on method, the liquid lens 212 may be supported and tilted by an external shaper (not shown) and the like of the lens module 210. Here, a plurality of such liquid lenses 212 may be included.

According to another embodiment, some of the plurality of liquid lenses 212 are disposed above the plurality of solid lenses 214 and other liquid lenses 212 may be disposed between the plurality of solid lenses 214. That is, the liquid lenses 212 may be disposed using a method formed by combining the add-on method with the add-in method.

The plurality of solid lenses 214 and the liquid lens 212 may be aligned on the basis of a central axis so as to form an optical system. Here, the central axis may be equal to an optical axis of the optical system and may be referred to as a Z-axis in the specification.

The lens module 210 may further include a lens barrel 216, and a space capable of accommodating at least some of the lenses may be provided in the lens barrel 216. The lens barrel 216 may be rotatably coupled with one or the plurality of lenses but this is an example and may be coupled using another method such as a method using an adhesive (for example, an adhesive resin such as epoxy and the like).

A lens holder (not shown) may be coupled with and support the lens barrel 216 and may be coupled with the PCB (not shown) on which the image sensor 230 is mounted. A space in which the IR filter 220 may be attached to a bottom of the lens barrel 216 may be formed by the lens holder. A spiral pattern may be formed on an inner circumferential surface of the lens holder, and the lens holder may be rotatably coupled with the lens barrel 216 having an outer circumferential surface on which a spiral pattern is formed like this. However, this is merely an example, and the lens holder and the lens barrel 216 may be coupled with each other using an adhesive or may be integrally formed.

However, this example is merely one embodiment, and the lens barrel and the lens holder of the lens module 210 may have a variety of structures capable of condensing and transferring light incident on the camera device 10 to the image sensor 230.

According to the embodiment of the present invention, at least one of a first driving portion (not shown) configured to control movement of the IR filter 220 or the image sensor 230 and a second driving portion (not shown) configured to control a curvature of the liquid lens 212 may be further included. Here, the first driving portion may include an actuator directly or indirectly connected to the IR filter 220 or the image sensor 230 and the actuator may include at least one of micro electro mechanical systems (MEMS), a voice coil motor (VCM), and a piezoelectric element. Also, the second driving portion may be directly or indirectly connected to the liquid lens and may control the curvature of the liquid lens 212 by directly applying a voltage to the liquid lens 212 or controlling the voltage applied to the liquid lens 212.

A light path of light may be repetitively shifted by one of the first driving portion and the second driving portion according to a certain regulation and may be shifted by another of the first driving portion and the second driving portion according to certain control information.

When the light path is repetitively shifted according to a certain regulation, a super resolution function may be performed using the shifted light path. Also, when a light path of input light is shifted according to certain control information, optical image stabilization (OIS) may be performed using the shifted light path. For example, the certain control information may include control information for OIS extracted from movement information, posture information, and the like of the camera device.

As described above, the camera device according to the embodiment of the present invention may perform the SR method using a pixel shift technique.

For the pixel shift, the first driving portion may move a tilt of the IR filter 220 or the image sensor 230. That is, the first driving portion may tilt the IR filter 220 or the image sensor 230 to have a certain tilt with respect to an XY-plane perpendicular to the optical axis (Z-axis). Accordingly, the first driving portion may change a light path of at least one of input light rays in a subpixel unit of the image sensor 230. Here, the subpixel may be a unit greater than zero pixels and smaller than one pixel.

The first driving portion changes a light path of at least one of input light signals for each image frame. As described above, one image frame may be generated for each exposure cycle. Accordingly, the first driving portion may change a light path when one exposure cycle is finished.

The first driving portion may change the light path by a subpixel unit on the basis of the image sensor 230. Here, the first driving portion may change a light path of at least one of input light rays in any one of upward, downward, leftward, and rightward directions on the basis of a present light path.

FIG. 10 is a view illustrating the image sensor according to an exemplary embodiment of the present invention.

The image sensor 220 may be synchronized with a flickering cycle of the light emitting portion 100 and absorb light. In detail, the image sensor 220 may absorb each of in phase and out phase light output from the light emitting portion. That is, the image sensor 220 may repetitively perform operations of absorbing light at a time when the light source is turned on and absorbing light at a time when the light source is turned off.

Next, the image sensor 220 may generate an electrical signal corresponding to each of a plurality of reference signals having different phase differences using the reference signals. A frequency of the reference signal may be set to be equal to a frequency of an output light signal output from the light emitting portion. Accordingly, when the light emitting portion generates light with a plurality of frequencies, the image sensor 220 generates an electrical signal using the plurality of reference signals corresponding to the frequencies. The electrical signal may include information related to an electrical charge or voltage corresponding to each reference signal.

The image sensor 220 may have a structure in which a plurality of pixels are arranged in a grid shape. The image sensor 220 may be a complementary metal oxide semiconductor (CMOS) image sensor or may be a charge coupled device (CCD) image sensor 220. Also, the image sensor 220 may include a time of flight (TOF) sensor which receives IR light reflected by an object and measures a distance using a time or phase difference.

For example, as shown in FIG. 10, in the case of the image sensor 220 having a resolution of 320×240, 76,800 pixels are arranged in a grid shape. Here, a certain interval may be formed between the plurality of pixels like a shadow part of FIG. 10. In the embodiment of the present invention, one pixel will be described as including a pixel and a certain interval adjacent thereto. Here, the certain interval adjacent thereto is the shadow part between pixels in FIG. 10, and one pixel will be described as including intervals disposed on a right side and a bottom side of a pixel.

According to the embodiment of the present invention, each pixel 222 may include a first light receiving portion 222-1 including a first photo diode and a first transistor and a second light receiving portion 222-2 including a second photo diode and a second transistor.

The first light receiving portion 222-1 receives light in the same phase as that of a waveform of output light. That is, at the time when the light source is turned on, the first photo diode is turned on and absorbs light. That is, at the time when the light source is turned off, the first photo diode is turned off and stops absorbing light. The first photo diode converts the absorbed light into a current and transfers the current to the first transistor. The first transistor converts the transferred current into an electrical signal and outputs the electrical signal.

The second light receiving portion 222-2 receives light in an opposite phase to that of a waveform of light output from the light emitting portion. That is, at the time when the light source is turned on, the second photo diode is turned on and absorbs light. Also, at the time when the light source is turned off, the second photo diode is turned off and stops absorbing light. The second photo diode converts the absorbed light into a current and transfers the current to the second transistor. The second transistor converts the transferred current into an electrical signal.

Accordingly, the first light receiving portion 222-1 may referred to as an in-phase receiving unit, and the second light receiving portion 222-2 may be referred to as an out-phase receiving unit. As described above, when the first light receiving portion 222-1 and the second light receiving portion 222-2 are activated with a time difference, a difference in received light quantities occurs according to a distance from an object. For example, when the object is present right ahead the camera device, that is, a distance equals zero, since a time taken for light to be output from the light emitting portion and reflected by the object is zero, the flickering cycle of the light source becomes a receiving cycle of light without change. Accordingly, only the first light receiving portion 222-1 receives light and the second light receiving portion 222-2 can not receive light. As another example, when the object is located at a certain distance from the camera device, since time is taken for light to be output from the light emitting portion and then reflected by the object, the flickering cycle of the light source is different from the light receiving cycle. Accordingly, there is a difference between light quantities received by the first light receiving portion 222-1 and the second light receiving portion 222-2. That is, a distance from the object may be calculated using a difference in light quantities input to the first light receiving portion 222-1 and the second light receiving portion 222-2.

FIGS. 11A to 11D are views illustrating a result of extracting branch veins according to controlling intensity of output light.

According to one embodiment of the present invention, the object may be a human body. When the light emitting portion outputs light toward a human body, a part of the output light may be absorbed into hemoglobin included in blood of the human body. However, the part of the output light may not be absorbed but reflected by the hemoglobin included in the blood of the human body. The light not absorbed into the hemoglobin included in the blood of the human body and reflected may be condensed by the light receiving portion. For example, when the light emitting portion outputs light toward a finger, output light having an NIR wavelength may be absorbed into hemoglobin included in blood of the finger. Also, the light not absorbed into the hemoglobin included in the blood of the finger may be reflected and condensed by the light receiving portion.

FIGS. 11A to 11D illustrate results of capturing images of the finger at distances 3 cm, 5 cm, 10 cm, and 15 cm from the camera device 10 respectively. Light intensity of image capturing at each distance was controlled according to the embodiment of the present invention.

When the embodiment of the present invention was not used, a light saturation phenomenon occurred at a short distance such as 3 cm such that branch veins were not extracted. Also, quantity of light was lacking at a long distance such as 15 cm such that branch veins were not extracted.

However, when the embodiment of the present invention is used, according to the embodiment of the present invention, it may be seen that branch veins can be recognized at similar levels at 3 cm, 5 cm, 10 cm, and 15 cm.

Although the embodiments have been described above, the embodiments are merely examples and not intended to limit the present invention and it may be seen that a variety of modifications and applications not described above may be made by one of ordinary skill in the art without departing from the essential features of the embodiments. For example, the components described in the embodiments may be implemented while being modified. Also, it should be noted that differences related to the modifications and applications are included within the scope of the present invention defined by the claims.

The invention claimed is:

1. A camera device comprising:
    a light emitter configured to change a light path of light according to a first control signal to selectively output the light along a first light path or a second light path;
    a light receiver configured to receive the light reflected by an object and generate an electrical signal; and
    a controller configured to generate the first control signal which controls the light path of the light to be selectively changed to the first light path or the second light path,
    wherein the light emitter is configured to output the light with a first pattern along the first light path or output the light with a second pattern along the second light path,
    wherein the first pattern comprises a surface light source pattern, and
    wherein the second pattern comprises a point light source pattern.

2. The camera device of claim 1, wherein the controller is further configured to control the light emitter to operate only some light emitting elements among all light emitting elements when the surface light source pattern is output.

3. The camera device of claim 1, wherein the light emitter comprises:
    a light source comprising a plurality of light emitting elements and configured to generate the light;
    a lens assembly configured to condense light generated by the light source and output the condensed light along the first light path or the second light path; and
    a diffractor disposed to be spaced apart from the light source and configured to diffract the light.

4. The camera device of claim 3, wherein the plurality of light emitting elements are multiple vertical cavity surface emitting laser (VCSEL) elements.

5. The camera device of claim 3, wherein the lens assembly comprises a first liquid and a second liquid having a refractive index different from that of the first liquid, and
    wherein an interface formed by the first liquid and the second liquid varies according to the first control signal.

6. The camera device of claim 5, wherein the lens assembly changes a level of scattering the light according to a curvature of the interface formed by the first liquid and the second liquid.

7. The camera device of claim 3, wherein the lens assembly is disposed between the light source and the diffractor or disposed on an upper end of the diffractor.

8. The camera device of claim 3, wherein the light emitter is configured to supply power of a power source to the light source according to a second control signal.

9. The camera device of claim 8, wherein when the light is output along the first light path, the light emitter generates light by separately operating some of the plurality of light emitting elements or generates the light by operating light emitting elements arranged in a preset region among the plurality of light emitting elements according to the second control signal.

10. The camera device of claim 8, wherein the second control signal controls an exposure time of the light or a duty rate of a power pulse of the light.

11. The camera device of claim 8, wherein the light emitter comprises a plurality of switching elements connected to the plurality of light emitting elements, and
    wherein the light emitter is configured to supply power to the light source by turning on the plurality of switching elements in a pulse generation section of the second control signal and stops power supply to the light source by turning off the plurality of switching elements in a non-pulse generation section of the second control signal.

12. The camera device of claim 8, wherein the controller is configured to control a pulse width of the second control signal according to a chroma value of image data corresponding to the electrical signal,
    wherein a preset pulse width of the second control signal is maintained when the chroma value differs from a preset maximum chroma value, and
    wherein the preset pulse width of the second control signal is reduced width when the chroma value is equal to the preset maximum chroma value.

13. The camera device of claim 8, wherein the diffractor is implemented to have a plate shape comprising a first surface configured to receive the light and a second surface configured to output the light being diffracted, and
    wherein the first surface comprises a plurality of micro lenses arranged at certain pitches, and the second surface is implemented to have a plane or a spherical shape having a certain curvature.

14. The camera device of claim 1, wherein the light has a wavelength in a near infrared (NIR) region.

15. The camera device of claim 1, wherein the light emitter is configured to output the light towards a human body, and
    wherein the light receiver is configured to condense light that is unabsorbed into hemoglobin, which is included in blood of the human body, and reflected by the human body.

* * * * *